United States Patent
Bauer et al.

(10) Patent No.: US 6,897,404 B2
(45) Date of Patent: May 24, 2005

(54) METHOD AND DEVICE FOR WELDING CONTACTS TO OPTICAL WAVEGUIDES

(75) Inventors: Lothar Bauer, Wiesbaden (DE); Robert Germann, Gross Umstadt (DE); Michael Gerst, Worms (DE); Helmut Kreuzer, Gross-Zimmern (DE); Gerd Stegmayer, Gross Gerau (DE)

(73) Assignee: Tyco Electronics AMP GmbH, Bensheim (DE)

( * ) Notice: Subject to any disclaimer, the term of this patent is extended or adjusted under 35 U.S.C. 154(b) by 0 days.

(21) Appl. No.: 10/409,379

(22) Filed: Apr. 8, 2003

(65) Prior Publication Data

US 2004/0031777 A1 Feb. 19, 2004

(30) Foreign Application Priority Data

Apr. 17, 2002 (DE) .......................... 102 17 104

(51) Int. Cl.[7] .......................... B23K 26/22; G02B 6/36; G02B 6/38
(52) U.S. Cl. ............................ 219/121.63; 219/121.64; 219/121.82
(58) Field of Search ........................ 219/121.63, 121.64, 219/121.82; 385/78

(56) References Cited

U.S. PATENT DOCUMENTS

| | | | |
|---|---|---|---|
| 4,644,817 A | 2/1987 | Johnson, Jr. | 29/33 |
| 4,859,827 A * | 8/1989 | Coyle et al. | 219/121.64 |
| 4,944,079 A | 7/1990 | Nakamura et al. | 29/33 |
| 5,098,005 A * | 3/1992 | Jack | 228/4.1 |

FOREIGN PATENT DOCUMENTS

| | | | | |
|---|---|---|---|---|
| DE | 199 19 428 A1 | 11/2000 | | |
| JP | 59147311 | 8/1984 | | G02B/7/26 |
| JP | 8-43863 A * | 2/1996 | | |
| WO | WO 01/88583 A1 | 11/2001 | | G02B/6/38 |

OTHER PUBLICATIONS

European Search Report dated Jun. 28, 2004 for application No. EP 03 00 7621.

* cited by examiner

*Primary Examiner*—Geoffrey S. Evans
(74) *Attorney, Agent, or Firm*—Barley, Snyder, Senft & Cohen, LLC

(57) ABSTRACT

A method and device for welding pin contacts and socket contacts to an optical waveguide, the welding device has a contact loading station, a contact transport carriage, a laser welding device, and an electrical control unit. The contact loading station has a socket contact transfer device and a pin contact transfer device. The contact transport carriage has a pin contact holder and a socket contact holder. The contact transport carriage is displaceable between the contact loading station and the laser welding station. The electrical control unit controls the combination and number of socket contacts and pin contacts transferred from the socket contact transfer device to the socket contact holder and from the pin contact transfer device to the pin contact holder without having to re-tool the welding device.

26 Claims, 8 Drawing Sheets

METHOD AND DEVICE FOR WELDING CONTACTS TO OPTICAL WAVEGUIDES

BACKGROUND OF THE INVENTION

The invention relates to a method and device for welding socket contacts and/or pin contacts to optical waveguides. More specifically, the invention relates to a method and device for welding plastic contacts to plastic optical waveguides.

DESCRIPTION OF THE PRIOR ART

It is known from DE 199 19 428 A1 to secure sleeve-like ferrules of plastic, into which a plastic optical waveguide has been introduced, to the optical waveguide by means of a laser welding process. The ferrules are also known as contacts and may take the form of a socket contact or a pin contact. Typically, one end of the optical waveguide is provided with the socket contact and another end of the optical waveguide is provided with the pin contact so that the two ends of the optical waveguide may be mated with each other.

Assembly machines with welding devices already exist for manufacturing the optical waveguides wherein the socket contacts or the pin contacts may be welded to the optical waveguide ends. The socket contacts and the pin contacts are fed from a supply reel on a narrow piece of plastic material formed in one piece therewith to form a strip. As the contacts are unwound from the supply reel, the contacts are separated from the strip by a severing device and are positioned in a contact holder. An end of the optical waveguide is then introduced into the contact and the contact is welded to the associated end.

The existing welding devices, which are generally of modular construction, are only capable of welding either the socket contacts or the pin contacts to the ends of the waveguides. To change from welding the socket contacts to welding the pin contacts or vice versa, a tool change or even a complete module change is required. Having to re-tool the welding device necessitates down time that negatively affects the output of the welding device. An example of such a welding device is manufactured by Tyco Electronics AMP GmbH, AMPèrestrasse 12–14, 64625 Bensheim, Germany, under the name "MOST Laser Module."

It is therefore desirable to develop a welding device wherein socket contacts and/or pin contacts may be welded as desired to respective optical waveguide ends without having to re-tool the welding device and without affecting the output of the welding device.

SUMMARY OF THE INVENTION

The invention relates to a welding device for welding pin contacts and socket contacts to an optical waveguide. The welding device has a contact loading station, a contact transport carriage, a laser welding device, and an electrical control unit. The contact loading station has a socket contact transfer device and a pin contact transfer device. The contact transport carriage has a pin contact holder and a socket contact holder. The contact transport carriage is displaceable between the contact loading station and the laser welding station. The electrical control unit controls the combination and number of socket contacts and pin contacts transferred from the socket contact transfer device to the socket contact holder and from the pin contact transfer device to the pin contact holder without having to re-tool the welding device.

The invention further relates to a method for welding pin contacts and socket contacts to an optical waveguide. The socket contacts and the pin contacts are transferred into respective socket contact holders and pin contact holders arranged on a contact transport carriage. The contact transport carriage is displaced to position the socket contacts and the pin contacts for receipt of the optical waveguide. The optical waveguide is welded to the socket contacts and the pin contacts at a laser welding station. The combination and number of the socket contacts and the pin contacts transferred to the socket contact holder and to the pin contact holder is controlled by an electrical control unit without having to re-tool the welding device.

BRIEF DESCRIPTION OF THE DRAWINGS

FIG. 2 is a perspective view of the structural unit of. FIG. 1;

DETAILED DESCRIPTION OF THE PREFERRED EMBODIMENT

Figure 1:
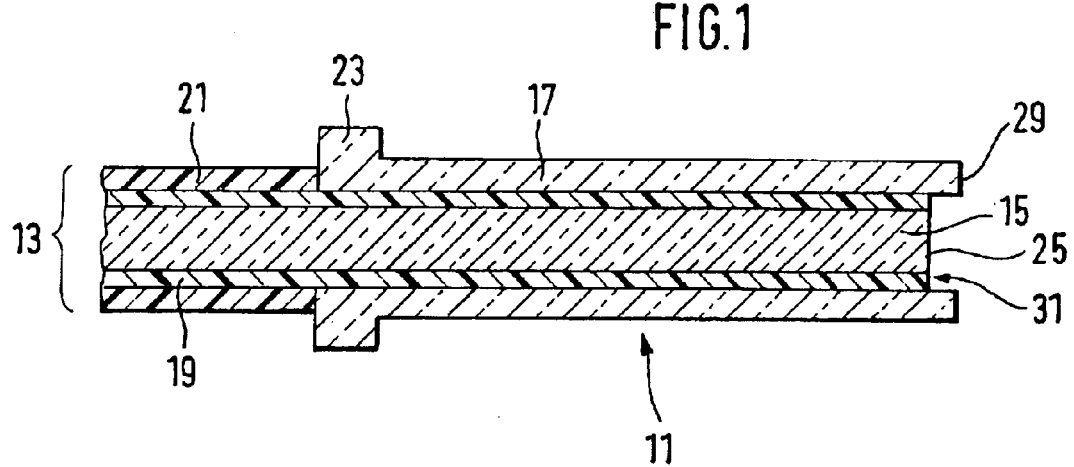
FIG. 1 is a cross-sectional view along a longitudinal axis of a structural unit with an end of an optical waveguide provided with a pin contact.

A structural unit 11 including an optical waveguide 13 and a pin contact 17 and/or socket contact 35 will first be described with reference to FIGS. 1 through 5. A first embodiment of a welding device 41 and a method thereof will then be described with reference to FIGS. 6 through 9. A second embodiment of the welding device 41 and a method thereof will thereafter be described with reference to FIGS. 10 and 11. It should be noted that the individual components and structural units of the embodiments shown in FIGS. 6 through 11 are known with regard to their construction and mode of operation, such that they will not be described in full herein. The components and structural units of known welding devices, such as the above-mentioned welding device "MOST Laser Module" made by Tyco Electronics AMP GmbH, will hereby be incorporated by reference.

Figure 2:
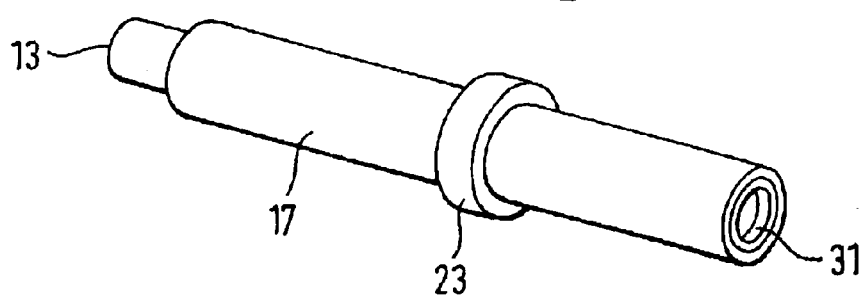

As shown in FIGS. 1 and 2, the structural unit 11 includes the optical waveguide 13 and the pin contact 17. The optical waveguide 13 has an inner cladding 19 and an outer cladding 21. The inner cladding 19 and the outer cladding 21 are removed from an end 15 of the optical waveguide 13. The end 15 has an end face 25 set back 31 with respect to a contact end face 29 to protect the sensitive, optically important end face 25. In practical embodiments, the optical waveguide 13 is set back 31 from $\frac{1}{100}$ mm to $\frac{1}{10}$ mm.

The pin contact 17 is arranged on the end 15 of the optical waveguide 13. The pin contact 17 consists of a plastic material that is more transparent than the material of the inner cladding 19. The pin contact 17 has an internal diameter that substantially corresponds to an external diameter of the inner cladding 19. The contact end face 29 is not positioned flush with the end 15 of the optical waveguide 13. The pin contact 17 has a flange 23 with an end face that abuts an end of the outer cladding 21. The flange 23 may also act as a stop for the socket contact 35 (not shown in FIGS. 1 and 2), when the pin contact 17 is mated with the socket contact.

Figure 3:
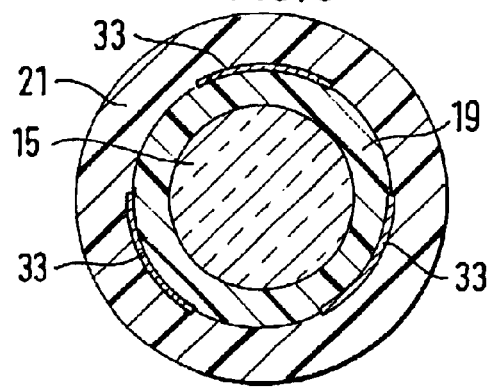
FIG. 3 is a radial cross-sectional view of the structural unit of FIG. 1.

As shown in FIG. 3, the external circumference of the inner cladding 19 and the internal circumference of the pin contact 17 are welded together by laser welding at weld points 33. In FIG. 3, the inner cladding 19 and the internal circumference of the pin contact 17 are welded together at three weld points 33. Because the pin contact 17 consists of a plastic material that is more transparent than the material of the inner cladding 19, the laser light can almost completely penetrate the pin contact 17 during irradiation and thereby produce welds in a radially outermost area of the inner cladding 19 of the optical waveguide 13.

Figure 4:
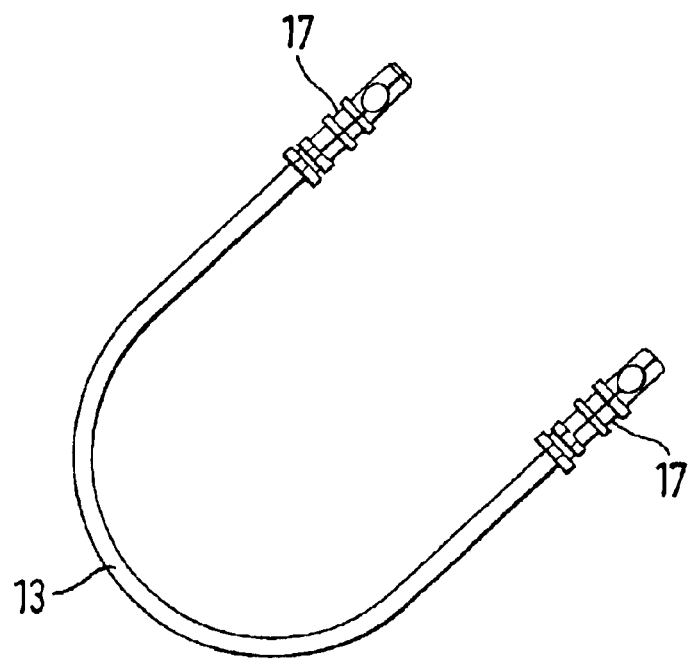
FIG. 4 is a plan view of the optical waveguide provided with two pin contacts.
Figure 5:
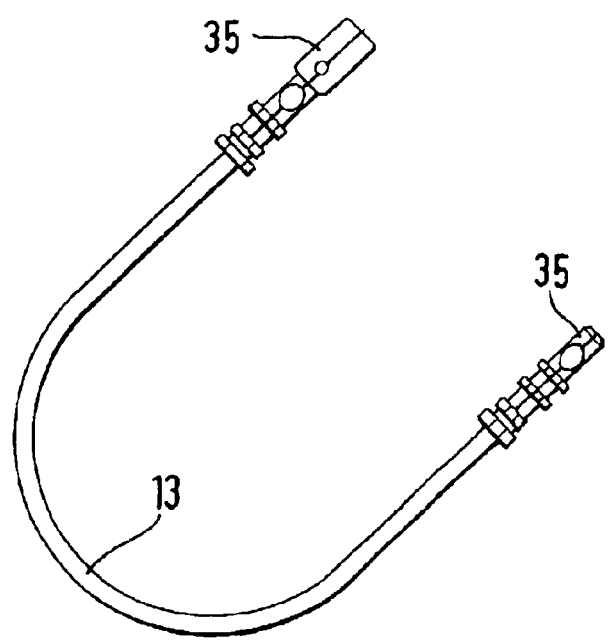
FIG. 5 is a plan view of the optical waveguide provided with a pin contact and a socket contact.

FIG. 4 shows an example of the optical waveguide 13 with the pin contact 17 welded to each end thereof. FIG. 5 shows an example of the optical waveguide 13 with the pin contact 17 welded to one end and the socket contact 35 welded to another end thereof. Instances may also arise in which the optical waveguide 13 may have the socket contact 35 welded to each end thereof. The pin contacts 17 take a somewhat different form in FIGS. 4 and 5 than in FIGS. 1 and 2.

Figure 6:
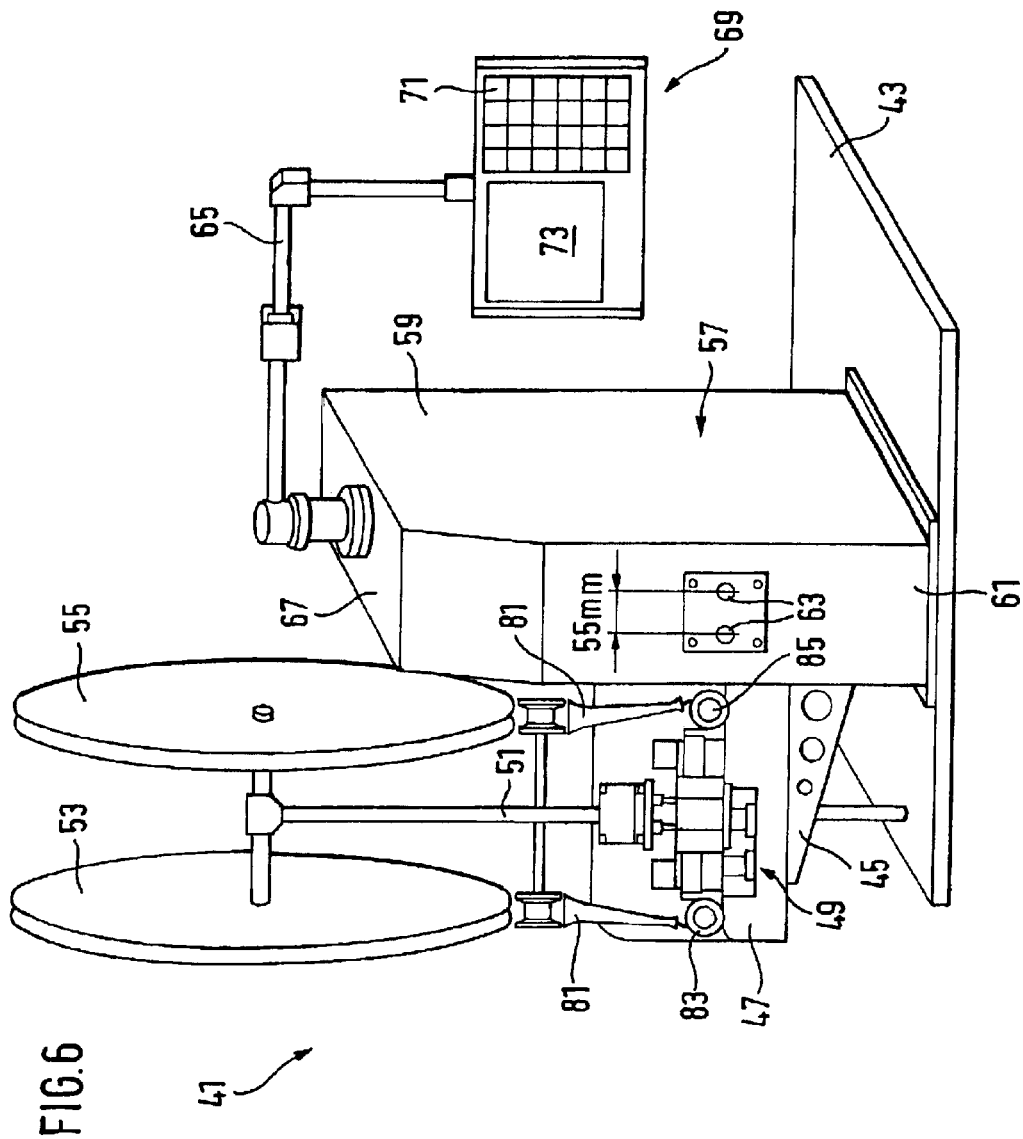
FIG. 6 is a perspective view of a first embodiment of a welding device.
Figure 6:
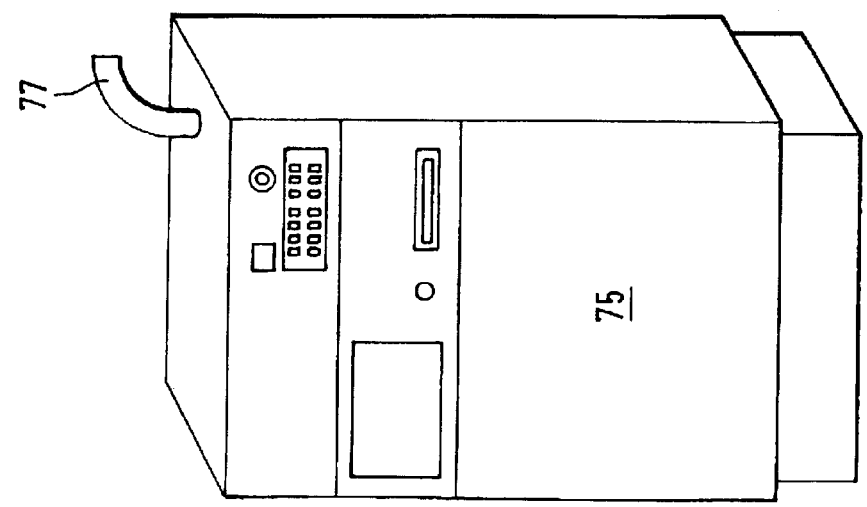

The first embodiment of the welding device 41 will now be described in greater detail with reference to FIGS. 6 through 9. As shown in FIG. 6, the welding device 41 has an electrical control unit 75 and a base plate 43 provided with a centrally positioned laser welding station 57 attached to a setting panel 69 and a contact loading station 49. The laser welding station 57 has a housing 59. A wall 61 of the housing 59 has two optical waveguide feed funnels 63. A cover 67 of the housing 59 is provided with a bracket 65. The bracket 65 contains electrical data and control lines for connecting the setting panel 69 to the rest of the welding device 41. The setting panel 69 includes a keypad 71 and a screen 73.

Figure 9:
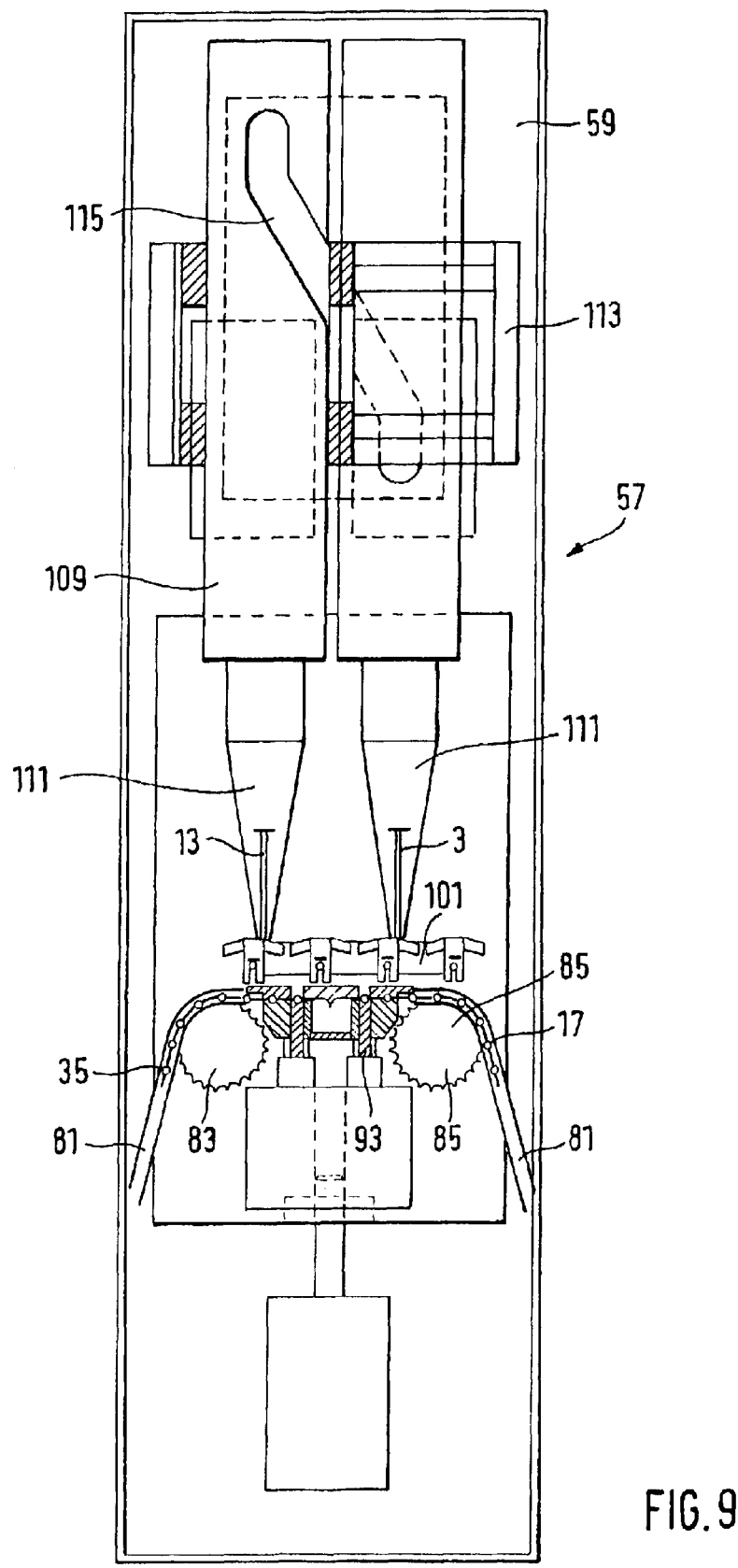
FIG. 9 is a front view of a laser welding station of the welding device of FIG. 6.

As shown in FIG. 9, the laser welding station includes a single displaceable laser 109. It is also possible to provide two or more lasers instead of a single displaceable laser, in accordance with the module widths, which in the embodiment illustrated is 55 mm when two lasers are used or 27.5 mm when three lasers are used. The laser 109 produces a laser beam 111 and is arranged on a horizontally displaceable laser carriage 113.

The electrical control unit 75 is connected with the rest of the welding device 41 by an electrical cable 77 (only a cable end is shown in FIG. 6). The electrical control unit 75 has a programmable control device (not shown). The programmable control device (not shown) is preferably in the form of a microprocessor or a microcontroller wherein the selection of specific control programs and/or the setting of specific control parameters is possible by means of the setting panel 69.

Proximate the laser welding station 57 is the contact loading station 49. The contact loading station 49 is arranged above the base plate 43 on a board 47 provided on a support 45 that extends from the base plate 43. The board 47 has a stand 51. An upper end of the stand 51 holds a socket contact supply reel 53 and a pin contact supply reel 55. The socket contact supply reel 53 and the pin contact supply reel 55 may be located above the contact loading station 49, as shown in FIG. 6, or beneath the contact loading station 49, as shown in FIGS. 7 and 8.

Figure 7:
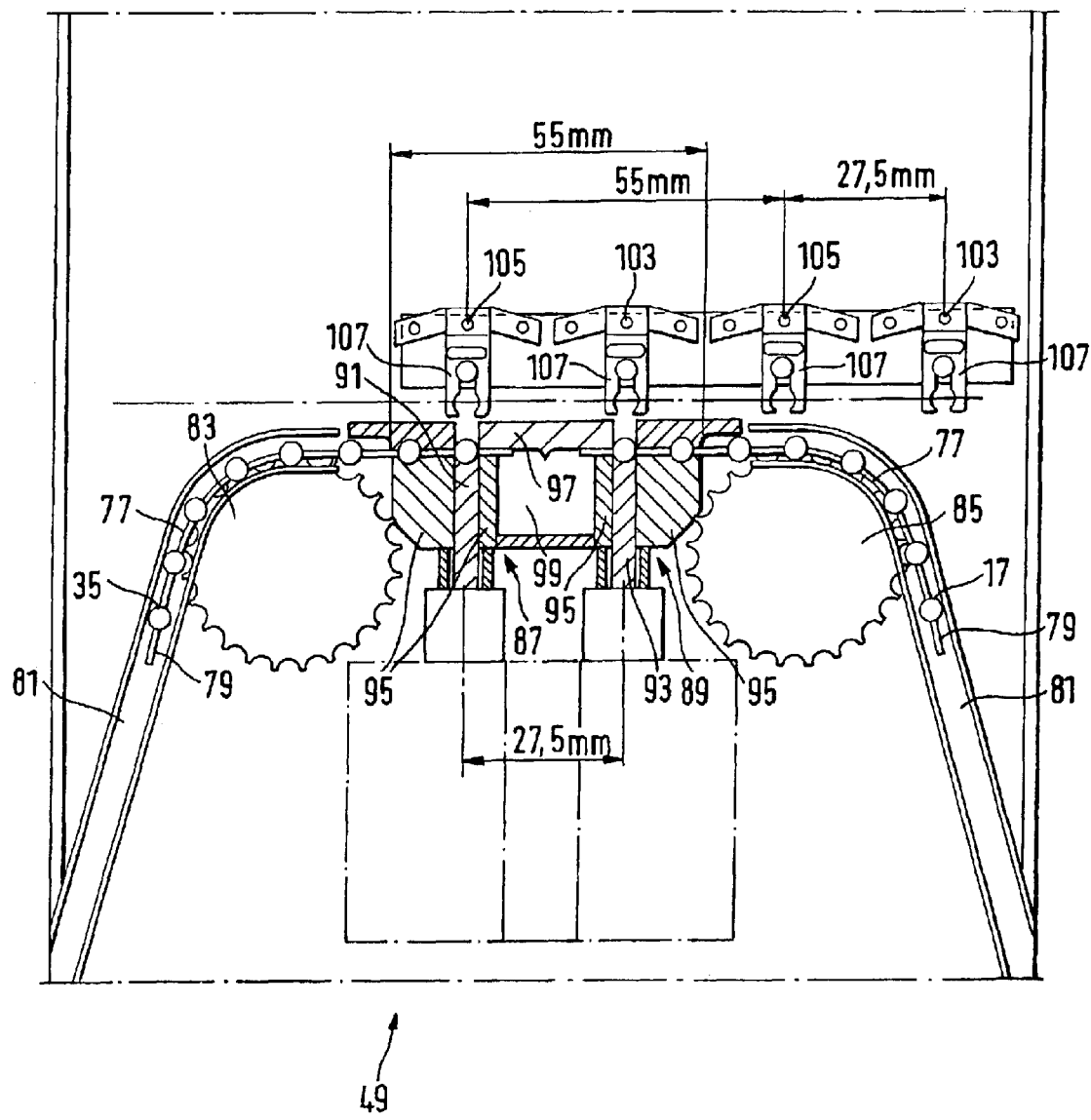
FIG. 7 is a partial front view of the welding device of FIG. 6 in a first operating phase.
Figure 8:
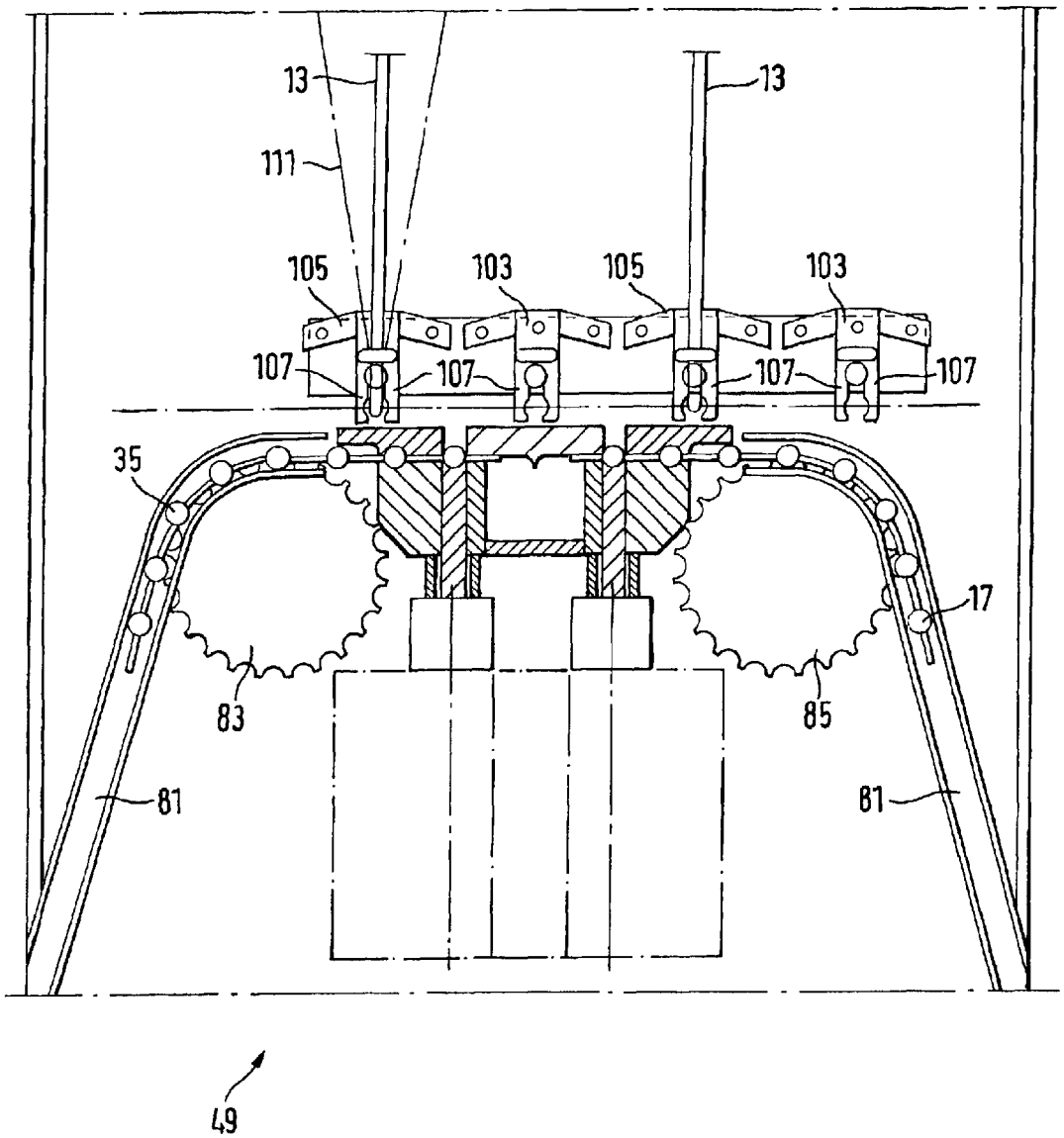
FIG. 8 is a partial front view of the welding device of FIG. 6 in a second operating phase.

As best shown in FIGS. 7 and 8, the socket contact supply reel 53 and the pin contact supply reel 55 are wound with a strip 79 of either the pin contacts 17 or the socket contacts 35. The strip 79 is formed by connecting neighboring contacts 17, 35 by connecting webs 77. Because the welding device 41 described herein is principally intended for welding plastic contacts to plastic optical waveguides, the pin contacts 17, socket contacts 35, and the connecting webs 77 preferably consist of the same plastic material and the connecting webs 77 and the contacts 17, 35 held therebetween are formed in one piece. The strip 79 is conveyed in a controlled manner via a conveying duct 81 to a strip feed roller for socket contact feed 83 or a strip feed roller for pin contact feed 85. The respective strips 79 are deflected from an approximately vertical conveying direction to a substantially horizontal conveying direction during feeding.

As shown in FIG. 7, a pin contact separating device 87 and a socket contact separating device 89 are located proximate the contact loading station 49. Each separating device 87, 89 has a cutting punch 91, 93, respectively, movable in a vertical direction. On both sides of each cutting punch 91, 93 is a connecting web holding-down device 95 and a counter-cutter 97. The cutting punches 91, 93 and the counter-cutter 97 shear-off the connecting webs 77 located on each side of the contacts 17, 35, when the cutting punch 91, 93 moves upward. An extraction duct 99 is arranged in the space formed between the two mutually facing connecting web holding-down devices 95 of the separating devices 87, 89. The extraction duct 99 extracts the connecting webs 77 severed from the contact strips 79.

As shown in FIG. 7, a contact transport carriage 101 is arranged above the separating devices 87, 89. The contact transport carriage 101 may be displaced in relation to the separating devices 87, 89 in a horizontal direction (with regard to FIG. 7). A number of contact holders 103, 105 are arranged on the contact transport carriage 101. Four contact holders 103, 105 are arranged in the embodiment illustrated. Two of the contact holders are socket contact holders 103 and two of the contact holders are pin contact holders 105. The socket contact holders 103 and the pin contact holders 105 are arranged alternately in the carriage displacement direction and at a predetermined distance from each other. Each of the contact holders 103, 105 has a clamping arm pair 107. Each clamping arm pair 107 has two clamping arms. The clamping arm pair 107 accommodates and temporarily, resiliently secures the pin contact 17 or the socket contact 35. The shape and spacing of the clamping arms of each clamping arm pair 107 conform to the external shape of the pin contact 17 or the socket contact 35, i.e. the socket contact holders 103 and the pin contact holders 105 are only suitable for temporarily securing the socket contacts 35 or the pin contacts 17, respectively.

The two cutting punches 91, 93 exhibit a centre-to-centre distance from one another of 27.5 mm, the centre-to-centre distance is also displayed by mutually adjacent contact holders 103, 105. In this way, the pin contact holders 105 and the two socket contact holders 103 each exhibit a centre-to-centre distance from one another of 55 mm. Other dimensions and spacings, however, are possible.

To transfer the contacts 103, 105 from the respective separating devices 87, 89 to the contact transport carriage 101, the contact transport carriage 101 is displaced such that one of the two pin contact holders 105 is in alignment with the pin cutting punch 91 and/or one of the two socket contact holders 103 is in alignment with the socket cutting punch 93. By moving the cutting punches 91, 93 upwards, the relevant pin contact 17 or socket contact 35 is severed from the strip 79 and is transferred directly into the respective pin contact holder 105 or socket contact holder 103 positioned thereabove. The contacts 103, 105 are held firmly thereby by means of the resiliently pretensioned clamping arms 107.

Since the pin contact holders 105 conform to the shape of the pin contacts 17 and the socket contact holders 103 conform to the shape of the socket contacts 35, the pin contacts 17 and the socket contacts 35 may be conveyed into the contact loading station 49 with each working cycle of the welding device 41. It is possible to transfer as desired two of the pin contacts 17, two of the socket contacts 35, or one of the pin contacts 17 and one of the socket contacts 35 into the two pin contact holders 105, the two socket contact holders 103, or one of the two pin contact holders 105 and one of the two socket contact holders 103, respectively. In this way, two of the pin contacts 17, two of the socket contacts 35, or one of the pin contacts 17 and one of the socket contacts 35 may be welded as selected to the ends 15 of the optical waveguide 13. A different contact pairing selection for each working cycle is made possible by programming, so the need for re-tooling is eliminated.

After the contact holders 103, 105 are loaded with the pin contacts 17 and/or the socket contacts 35 in the loading position illustrated in FIG. 7, the contact transport carriage 101 is displaced into a position in which one of the two contact holders 103, 105 is aligned with the laser beam 111. When the contact transport carriage 101 is displaced, the centre lines of the two contact holders 103, 105 are aligned with the centre lines of the ends 15 of the optical waveguide 13 that are positioned by the optical waveguide feed funnels 63. The ends 15 are introduced into the contacts 17, 35 by an optical waveguide feed device (not shown). The respective contacts 17, 35 and the respective ends 15 have a predetermined relative axial position such that the desired degree of set-back 31 (FIG. 1) is achieved with a predetermined exacting tolerance.

After introduction of the ends 15 of the optical waveguide 13 into the contact holders 103, 105, welding is performed. The contact 17, 35, which is located in alignment with the laser 109, is welded to the end 15 of the optical waveguide 13. The laser 109 is then moved into alignment with the contact 17, 35 held by the other contact holder 103, 105. The contact 17, 35 is welded to the end 15 of the optical waveguide 13. Movement of the laser carriage 113 is controlled with an obliquely extending control channel 115 that is in engagement with a control pin (not shown) that may be moved in a vertical direction by a drive (not shown). The control channel 115 is designed so that the laser carriage 113 may be displaced at least the horizontal distance between the two socket contact holders 103 or the two pin contact holders 105 on the contact transport carriage 101, i.e., 55 mm in the embodiment illustrated.

A working cycle of the welding device 41 according to the first embodiment shown in FIGS. 6 through 9 will now be described in greater detail. The electrical control unit 75 is programmed to control whether two of the pin contacts 17 or one of the pin contacts 17 and one of the socket contacts 35 are to be welded to the ends 15 of the optical waveguide 13 during the work cycle. The contact transport carriage 101 is brought into a suitable loading position. If two of the pin contacts 17 are to be welded to the ends 15 of the optical waveguide 13, the contact transport carriage 101 is moved until the left-hand pin contact holder 105 is aligned with the pin cutting punch 93. The left-hand pin contact holder 105 is loaded with the pin contact 17 that has been severed from the strip 79. The contact transport carriage 101 is moved until the right-hand pin contact holder 105 is aligned with the pin cutting punch 93. A further pin contact 17 is severed from the strip 79 and is transferred into the right-hand pin contact holder 105. If two of the socket contacts 35 are to be welded to the ends 15 of the optical waveguide 13, the procedure is the same, except that the left-hand socket contact holder 103 and then the right-hand socket holder 103 are loaded one after the other with a socket contact 35 severed from the strip 79 by the socket cutting punch 91. If the pin contact 17 is to be welded to the end 15 of the optical waveguide 13 and the socket contact 35 is to be welded to the other end 15 of the optical waveguide 13, the pin contact 17 is transferred from the strip 79 to the left-hand pin contact holder 105 and the socket contact 35 is transferred from the strip 79 to the left-hand socket contact holder 103.

The contact transport carriage 101 is moved into a position wherein the left-hand of the two contact holders 103, 105 is aligned with the laser beam 111 and the waveguide feed funnels 63. The ends 15 of the optical waveguide 13 are introduced through the waveguide feed funnels 63 into the contacts 17, 35. After the ends 15 of the optical waveguide 13 are received in the respective contacts 17, 35, the ends 15 of the two optical waveguide 13 are secured to the respective contacts 17, 35 by welding. One of, the two contacts 17, 35 is first welded to the respective end 15. The laser 109 is then displaced by the horizontal carriage 113 into a position corresponding with the other contact 17, 35. The other contact 17, 35 is then welded to the respective end 15. The resulting structural unit 11 is gripped by gripping arms (not shown) and removed from the welding device 41.

The second embodiment of the welding device 41 will now be described in greater detail with reference to FIGS. 10 and 11. The welding device 41 of the first embodiment has a maximum working cycle rate, i.e., working cycle frequency. A working cycle rate exceeding this rate may be achieved with the second embodiment of the welding device 41.

Figure 10:
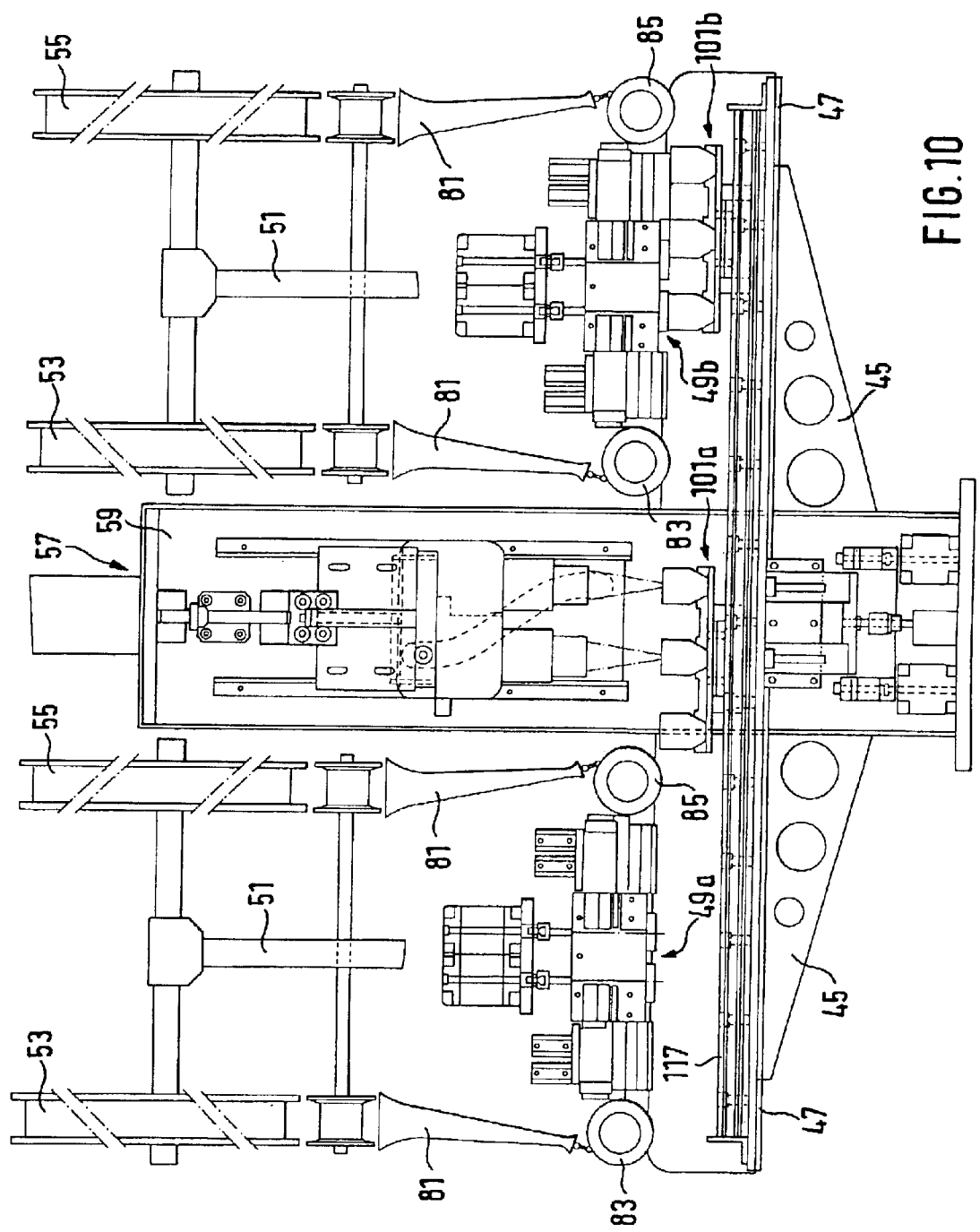
FIG. 10 is a partially schematic plan view of a second embodiment of the welding device.

The welding device 41 of the second embodiment has a laser welding station 57 similar to the first embodiment, but has two contact loading stations 49a, 49b, as shown in FIG. 10. The contact loading stations 49a, 49b are arranged on opposite sides of the laser welding station 57. The contact loading stations 49a, 49b each include the elements and structural units illustrated and described in relation to FIGS. 6 through 9, with the exception that each of the two contact transport carriages 101a, 101b has only three contact holders. Because each of the contact transport carriages 101a, 101b has only three contact holders, the optical waveguide 13 is limited to being manufactured with either two pin contacts 17 or one pin contact 17 and one socket contact 35. The optical waveguide 13 can not be manufactured with socket contacts 35 welded to the ends 15 thereof. Each of the contact transport carriages 101a, 101b is provided with two pin contact holders 105 and one socket contact holder 103, such that a structural unit 11 according to FIG. 4 or 5 may be produced with each of the contact transport carriages 101a, 101b.

Figure 11:
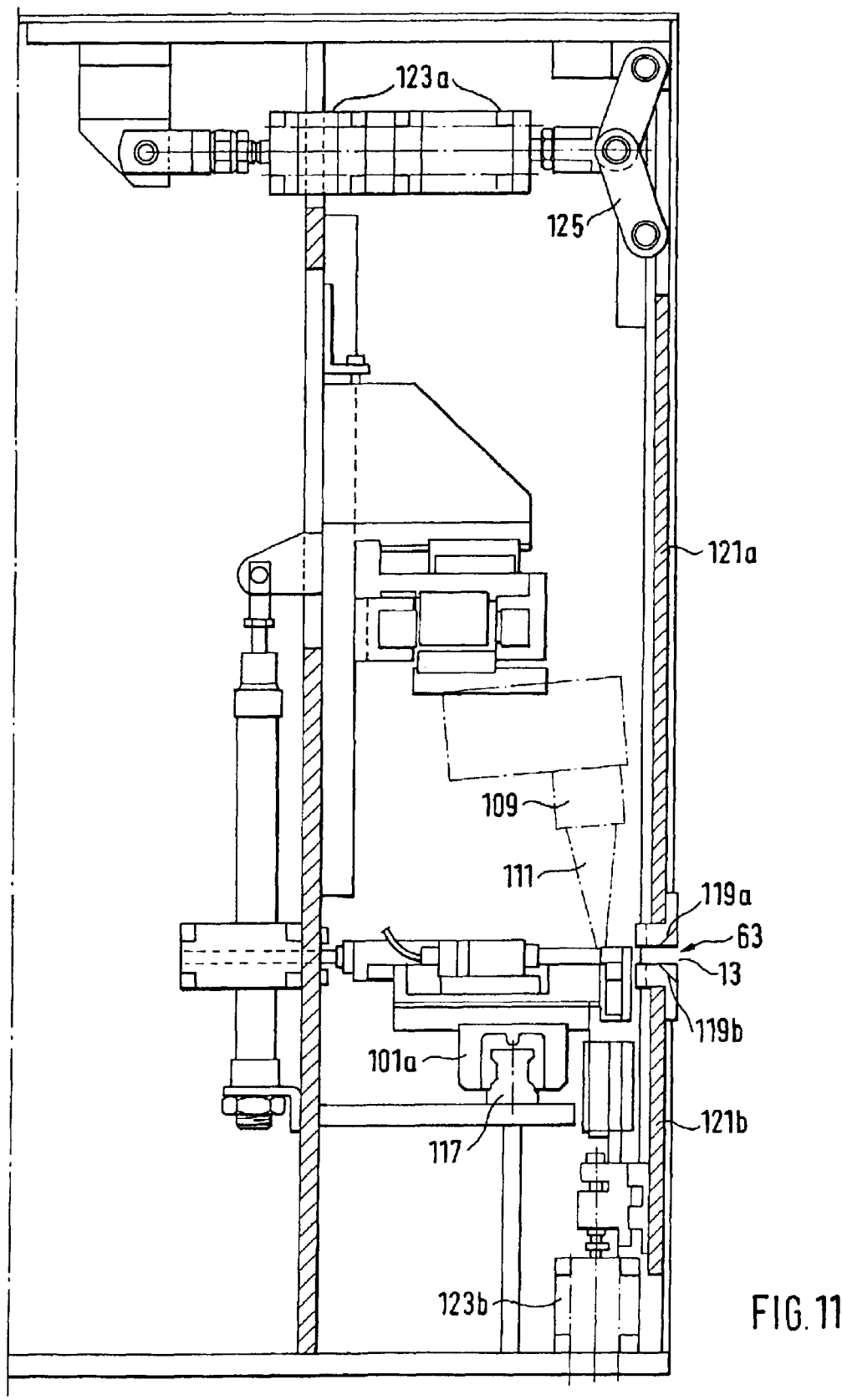
FIG. 11 is a side view of the welding device of FIG. 10.

As best shown in FIG. 11, the left-hand contact transport carriage 101a is positioned on a running rail 117. In each of the positions between which the laser 109 may be displaced, there is located one of the two feed funnels 63. Each of the feed funnels 63 includes an upper feed funnel half 119a and a lower feed funnel half 119b. The feed funnel halves 119a, 119b are formed at lower ends of upper feed funnel plates 121a, 121b, respectively. The two feed funnel plates 121a, 121b may be moved by means of an upper cylinder drive 123a or a lower cylinder drive 123b between an open position, in which an end 15 of the optical waveguide 13 may be passed through the respective feed funnel 63, and a clamping position, in which the resulting structural unit 11 after welding may be clamped. The upper feed funnel plate 121a is moved with the interconnection of a toggle lever 125.

The working cycle of the welding device 41 according to the second embodiment shown in FIGS. 10 and 11 will now be described in greater detail. As shown in FIG. 10, the loading stations 49a, 49b operate in a phase-displaced, push-pull manner, such that one of the contact transport carriages 101a, 101b is located at the loading station 49a, 49b and the other contact transport carriage 101a, 101b is located at the laser station 57. For example, FIG. 10 shows a phase in which the right-hand contact transport carriage 101b is located in the right-hand loading position 49b and is being loaded with the contacts 17, 35, and the left-hand contact transport carriage 101a is located in the laser station 57 and the ends 15 of the optical waveguide 13 are being introduced into the contacts 17, 35 and welded thereto. After welding, the resulting structural unit 11 is removed from the welding device 41, and the left-hand contact transport carriage 101a is displaced into the left-hand loading station 49a and the right-hand contact transport carriage 101b loaded with contacts 17, 35 is displaced into the laser station 57. The ends 15 of the optical waveguide 13 are introduced into the contacts 17, 35 held by the right-hand contact transport carriage 101b and are welded thereto, while the left-hand contact transport carriage 101a is being loaded with the contacts 17, 35.

In providing the second embodiment of the welding device 41 with two loading stations 49a, 49b, each of the loading stations 49a, 49b are associated with two contact supply reels 53, 55. A working cycle rate, therefore, may be achieved which is roughly twice that of the first embodiment of the welding device 41 that has only a single loading station 49.

We claim:

1. A welding device for welding socket contacts and pin contacts to an optical waveguide, comprising:
   a contact loading station having a socket contact transfer device and a pin contact transfer device;
   a contact transport carriage having a pin contact holder and a socket contact holder, the contact transport carriage is displaceable between the contact loading station and a laser welding station; and
   an electrical control unit that controls the combination and number of socket contacts and pin contacts transferred from the socket contact transfer device to the socket contact holder and from the pin contact transfer device to the pin contact holder without re-tooling the welding device.

2. The welding device of claim 1, further comprising an optical waveguide feed funnel that introduces the optical waveguide into the socket contact held by the socket contact holder or the pin contact held by the pin contact holder.

3. The welding device of claim 1, wherein the pin contacts and the socket contacts are provided in separate strips, each of the strips having a plurality of the pin contacts or the socket contacts connected by webs.

4. The welding device of claim 3, further comprising a separating device for separating the pin contacts and the socket contacts from the strip.

5. The welding device of claim 4, wherein the separating device simultaneously separates the pin contacts and the socket contacts from the strip and conveys the pin contacts and the socket contacts into the corresponding pin contact holder or socket contact holder.

6. The welding device of claim 5, wherein the separating device includes a cutting punch, a counter-cutter, and a web holding-down device, the counter-cutter separates the web from the socket contact or the pin contact when the cutting punch moves upward to convey the pin contact or the socket contact into the respective pin contact holder or socket contact holder.

7. The welding device of claim 4, further comprising an extraction duct for removing the webs separated from the pin contacts and the socket contacts.

8. The welding device of claim 1, wherein the laser welding station includes a single displaceable laser.

9. The welding device of claim 1, wherein the socket contacts, the pin contacts, and the optical waveguides are made from plastic.

10. The welding device of claim 1, wherein the contact transport carriage has two socket contact holders and two pin contact holders arranged alternately in a direction of displacement.

11. The welding device of claim 1, wherein the socket contact holder and the pin contact holder each have a pair of clamping arms that secure the pin contact or the socket contact in the respective pin contact holder or socket contact holder.

12. The welding device of claim 1, further comprising a second contact loading station with a second contact transport carriage.

13. The welding device of claim 12, wherein the contact loading station and the second contact loading station act in a phase-displaced, push-pull manner such that when the contact transport carriage is located at the laser welding station, the second contact transport carriage is located at the second loading station and when the second contact transport carriage is located at the laser welding station, the contact transport carriage is located at the loading station.

14. The welding device of claim 13, wherein the contact transport carriage and the second contact transport carriage each have one socket contact holder and two pin contact holders.

15. A method for welding socket contacts and pin contacts to an optical waveguide, comprising:
   transferring the socket contacts and the pin contacts into respective socket contact holders and pin contact holders arranged on a contact transport carriage;
   displacing the contact transport carriage to position the socket contacts and the pin contacts for receipt of the optical waveguide;
   welding the optical waveguide to the socket contacts and the pin contacts at a laser welding station; and
   controlling the combination and number of the socket contacts and the pin contacts transferred to the socket contact holder and to the pin contact holder without re-tooling the welding device.

16. The method of claim 15, further comprising providing the socket contacts and the pin contacts in separate strips, each of the strips having a plurality of the pin contacts or the socket contacts connected by webs.

17. The method of claim 16, further comprising separating the pin contacts and the socket contacts from the strip.

18. The method of claim 15, further comprising removing the webs separated from the socket contacts and the pin contacts with an extraction duct.

19. The method of claim 15, wherein the transport carriage has two socket contact holders and two pin contact holders.

20. The method of claim 19, wherein two pin contacts are transferred to the pin contact holders.

21. The method of claim 19, wherein two socket contacts are transferred to the socket contact holders.

22. The method of claim 19, wherein one pin contact and one socket contact is transferred to the respective pin contact holder and socket contact holder.

23. The method of claim 15, further comprising:
transferring the socket contacts and the pin contacts into respective second socket contact holders and second pin contact holders arranged on a second contact transport carriage;
displacing the second contact transport carriage to position the socket contacts and the pin contacts for receipt of the optical waveguide; and
controlling the combination and number of socket contacts and pin contacts transferred to the second socket contact holder and to the second pin contact holder without re-tooling the welding device.

24. The method of claim 23, wherein the transport carriage and the second transport carriage each have one socket contact holder and two pin contact holders.

25. The method of claim 24, wherein two pin contacts are transferred to the pin contact holders.

26. The method of claim 24, wherein one pin contact and one socket contact is transferred to the respective pin contact holders and socket contact holders.

* * * * *